United States Patent [19]

Ikeuchi et al.

[11] Patent Number: 4,807,524
[45] Date of Patent: Feb. 28, 1989

[54] METHOD AND APPARATUS FOR PRODUCING A FOOD PRODUCT

[75] Inventors: Hiroji Ikeuchi; Kiyoaki Ikeuchi, both of Akashi, Japan

[73] Assignee: Kabushiki Kaisha Ikeuchi Tekkosho, Akashi, Japan

[21] Appl. No.: 879,984

[22] Filed: Jun. 30, 1986

Related U.S. Application Data

[63] Continuation-in-part of Ser. No. 818,618, Jan. 13, 1986, Pat. No. 4,692,341.

[30] Foreign Application Priority Data

Mar. 25, 1986 [JP]  Japan ................... 61-067692

[51] Int. Cl.⁴ .......................... A23P 1/00; A47J 37/00
[52] U.S. Cl. ........................................ 99/353; 99/373; 99/427; 99/483
[58] Field of Search ................. 99/483, 516, 534, 535, 99/353, 373, 427, 349, 352, 372, 374, 380, 381, 426, 439; 425/572, 547, 548; 17/32; 426/513, 516, 518, 412, 250, 305, 643; 249/55

[56] References Cited

U.S. PATENT DOCUMENTS

| | | | |
|---|---|---|---|
| 4,196,884 | 4/1980 | Zeman | 249/55 |
| 4,303,008 | 12/1981 | Hice et al. | 99/353 |
| 4,503,081 | 3/1985 | Ikoma et al. | 426/412 X |

Primary Examiner—Timothy F. Simone
Attorney, Agent, or Firm—Marshall, O'Toole, Gerstein, Murray & Bicknell

[57] ABSTRACT

This disclosure relates to apparatus and method for the production of fish-paste food products having the appearance of shelled shrimp, crab claws, lobster, abalone, etc. The apparatus comprises a two-piece mold with a mold cavity conforming to the shape of the product, means for spraying a coloring agent into the cavity, filling means for pressing a paste of ground fish meat into the mold cavity, a heating unit for heating and solidifying the fish paste, and means for removing the heated and solidified fish-paste food products from the mold. The invention further comprises the method of providing a split mold having a cavity generally conforming to the shape of a shellfish, spraying the inside wall of the cavity with an aqueous food coloring, filling the cavity with a meat paste under pressure, heating the mold and the paste to a sufficient temperature to cook and color the meat paste, and removing the product from the mold.

19 Claims, 10 Drawing Sheets

_FIG_1_

_FIG_2_

_FIG_3_

METHOD AND APPARATUS FOR PRODUCING A FOOD PRODUCT

RELATED APPLICATION

This application is a continuation-in-part of pending application Ser. No. 818,618 filed Jan. 13, 1986, now U.S. Pat. No. 4,692,341.

FIELD AND BACKGROUND OF THE INVENTION

The present invention relates to a method and apparatus for producing a food product having the appearance of the shelled meat of various shellfish, for molding and applying a coloring simulating the natural color of the product, produced mainly from a paste of ground fish meat.

It is known in the prior art to make a simulated shellfish, such as shrimp, crab claws, lobster and abalone, from a fish paste. For example, a paste of ground fish meat has been formed into a flat sheet, cut into thin bar-like shapes, gathered together and cooked, and colored to form bars having the appearance of crab legs (Kanikamaboko, for example). This type of technology is described in Japanese patent provisional publication No. 60-180564 laid open Sept. 14, 1985 and in our co-pending U.S. patent application Ser. No. 769,175 filed Aug. 26, 1985.

In addition, U.S. Pat. No. 4,303,008 issued on Dec. 1, 1981 to Hice et al. describes a method and apparatus for comminuting small pieces of a food product into a paste form, injecting this paste under pressure into molds with high thermal conductivity, heating the paste while it is kept at high pressure, and then removing the food product from the molds.

In accordance with this U.S. patent, the paste must be injected into the molds under pressure and then kept at high pressure during the heating process, thus requiring a system wherein the mold compression and the pressure are maintained, and also producing a food product which is too uniform in shape to resemble the actual shelled meat of shellfish, consequently failing to make the food product sufficiently appetizing.

To color the surface of such a food product with a food coloring to reproduce the natural color of the real shellfish, it has been common practise to wrap the shaped paste in a polyethylene film, the inner side of the film having been coated with a red food coloring, and then boil or steam the product so as to cook and transfer the coloring to the paste.

Although it has been sufficient to simply shape the fish paste into bars or cylinders and cut it into appropriate lengths, up until this invention there has been no method and apparatus for processing ground fish meat in order to produce fish-paste products having the true appearance of the shelled meat of shrimp, crab claws, lobster, and other shellfish.

While the prior art color transfer technique described above is useful in the coloring of bar-shaped products, it cannot be successfully applied to foods having intricate shapes such as simulated shrimps which have joints, for the food coloring cannot be evenly transferred, by the prior art method, to such irregular surfaces to faithfully reproduce the appearance of shrimp and the like.

It is a general object of the present invention to provide a method and apparatus for forming and coloring a simulated shellfish food product such as a shrimp, a claw of a crab, or the like, which makes basic improvements on the described prior art systems.

It is another object to provide means for continuous production of such products by moving molds in accordance with the progress of the production procedure, and apparatus to perform secondary heating of the food product in order to achieve a product with a much closer resemblance to the actual shelled meat of shellfish.

BRIEF SUMMARY OF THE INVENTION

This invention includes apparatus and method for the production of fish-paste food products having the appearance of shelled shrimp, crab claws, lobster, abalone, etc. The apparatus comprises a two-piece mold with a mold cavity conforming to the shape of the product, means for spraying a coloring agent into the cavity, filling means for pressing a paste of ground fish meat into the mold cavity, a heating unit for heating and solidifying the fish paste, and means for removing the heated and solidified fish-paste food products from the mold.

The invention further comprises the method of providing a split mold having a cavity generally conforming to the shape of a shellfish, spraying the inside wall of the cavity with an aqueous food coloring, filling the cavity with a meat paste under pressure, heating the mold and the paste to a sufficient temperature to cook and color the mat paste, and removing the product from the mold.

The invention further relates to large quantity production including means for injecting under pressure a paste of fish meat into the cavities of split molds which are constructed in such a manner that the cavities are formed in the shape of the desired shellfish, means for heating the fish paste from outside the molds, and means for opening the molds and removing the heated and solidified food product, the injection means being separated from the molds except during the injection process.

BRIEF DESCRIPTION OF THE DRAWINGS

The invention will be better understood from the following detailed description taken in conjunction with the accompanying figures of the drawings, wherein.

DETAILED DESCRIPTION OF THE DRAWINGS

The production apparatus in this invention is used to inject under pressure a paste of fish meat or the like into molds, apply heat, and then remove the food product. The molds are constructed in such a manner that the internal cavity is formed in the shape of a crustacean animal, such as the torso of a shrimp, the claws of a crab, or the body of a lobster.

Figure 1:
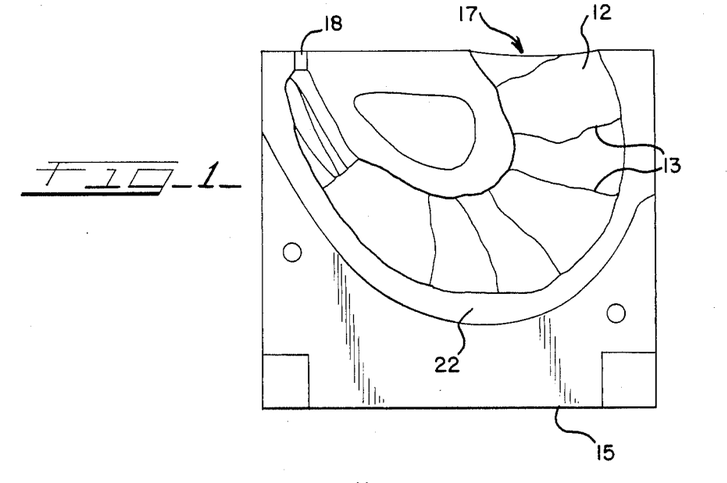
FIG. 1 is a view of a half of a mold for use in practising the invention.
Figure 2:
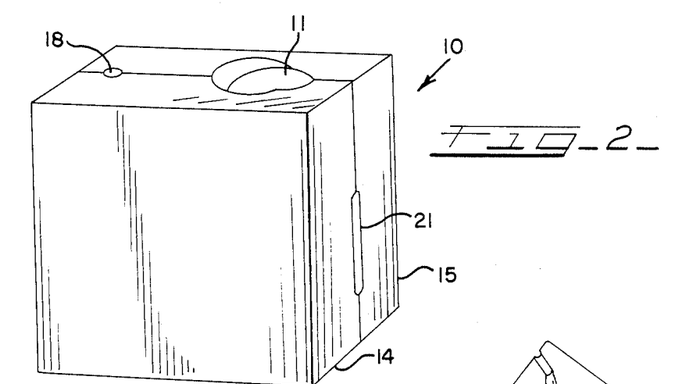
FIG. 2 is a perspective view showing the mold in the closed position.
Figure 3:
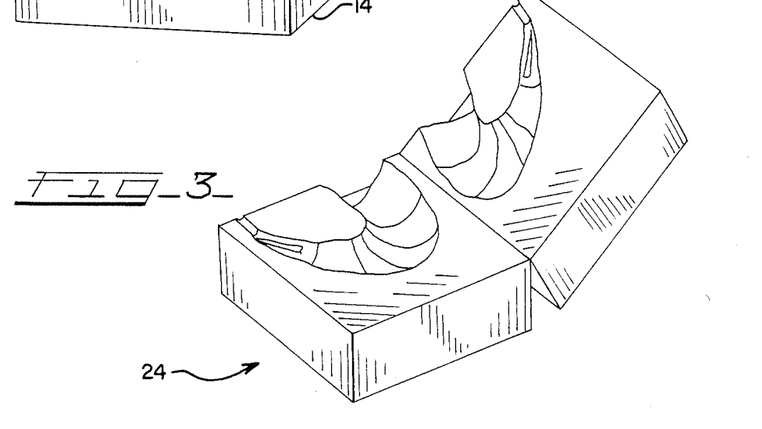
FIG. 3 is a perspective view showing the mold in the open position.

The body of a crustacean animal, or shellfish, such as a shrimp, crab, prawn or lobster, has an articulation or joint system for contracting and extending its body segments, and its carcass also shows a plurality of joints. With reference to FIGS. 1–2, in a metal mold 10 having a mold cavity 11 conforming to the shape of such a carcass, the segments 12 of the body and the joints 13 separating them are reversedly reproduced in the inside wall of the mold cavity. FIGS. 1–3 show a mold for producing a shrimp-shaped food product, and the cavity wall includes flat portions 12, with the joints being formed as crosswise projecting striations 13 (hereinafter referred to as projections). The mold 10 is split to form two halves 14 and 15, and the inside wall of the split metal mold is preferably Teflon coated so that the finished food product may be easily released and removed from the mold. The two ends of the cavity 11 appear at the surface of the mold and form two filling openings 17 and 18 which are preferably on the top side of the mold.

The mold halves 14 and 15 which constitute the split mold are closed and the crustacean meat paste is fed into the cavity 11 through the larger opening 17. Prior to this filling operation, the inside wall of the mold cavity 11 is sprayed with an aqueous solution or dispersion of food coloring. The coloring is added when the mold halves are closed and the spray enters the larger opening 17. The coloring so applied is deposited on the inside wall, but since the projections 13 of the inside wall act as barriers to the inflow of the coloring spray, there is formed a pool of the coloring in the portion of the segment 12 on the upstream side of the projection, while the portion of the segment 12 behind each projection 13 is substantially clear of the coloring. The resulting uneven coloration of the mold cavity wall due to the projections 13 gives an appearance closely resembling that of the actual crustacean. The meat paste is then fed into the mold cavity 11 under pressure and the mold is heated to cook and solidify the product. Finally, the metal mold is opened to remove the finished food product.

In the case of a mold for the manufacture of a paste food product simulating a shrimp, the cross section of the mold cavity is diminished towards the tail portion which connects to the smaller opening 18, so that the meat paste fed into the cavity through the opening 17 is subjected to a progressively increasing velocity of feed.

The result is that a relatively large proportion of the coloring previously deposited on flat portions 12 of the cavity wall is carried away by the meat paste flowing toward the tail portion. Consequently, the meat paste filling the tail portion of the cavity is colored with the deepest shade while the surface of the meat paste ultimately filling the flat portions 12 is stained only faintly red because much of the coloring has been substantially depleted. Moreover, the zones of the flat portions 12 behind the projections 13 are little stained because, after packing the meat paste up to the tail portion, the former zones are filled with the meat paste along the inner wall under the internal pressure of the mold, with the result that the contrast of the color densities at the joints of the shrimp are faithfully reproduced.

Since the inner wall of the metal mold is Teflon coated as previously mentioned, the food product can be neatly removed from the mold. The food product thus formed and colored has a sufficient density of color contrast where it is needed and gives a sensory quality approaching that of real crustacean meat.

With reference to FIGS. 1 and 2, the two mold halves 14 and 15 are pivotably connected together by a hinge 21. The reference numeral 22 in FIG. 1 indicates a Teflon lining in the mold halves. Suitable pins and holes may be provided to properly align the mold halves when they are closed.

The small opening 18 forms a vent hole which releases the trapped air from the cavity into the atmosphere as the meat paste fills the cavity. The food coloring is an aqueous solution or dispersion of food color which is sprayed in mist form into the mold cavity through the large opening 17 by means of a spray nozzle (not shown in FIGS. 1 and 2).

Thus, in accordance with the present invention, one is able to manufacture a food product having a sensory quality resembling that of real crustacean meat, from a raw material composed of meat paste, a binding agent and so on. It should be understood that the above-described production technique can be equally well applied to the manufacture of other paste foods simulating the claw of a crab, the carcass of a lobster, and so on.

FIG. 3 shows a mold 24 similar to the mold 10 but without a Teflon lining for the mold cavity. The entire mold may be made of a non-stick material such as Teflon or only a thin coating in the cavity may be provided. In addition an oil-based release agent may be sprayed on the inside of the mold prior to filling it with a meat paste.

Figure 4:
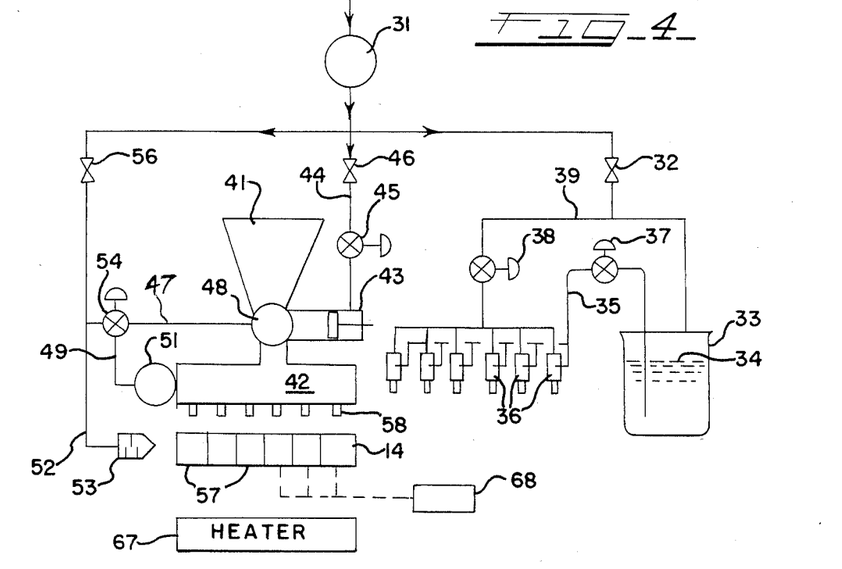
FIG. 4 is a schematic diagram of apparatus for practising the invention.
Figure 5:
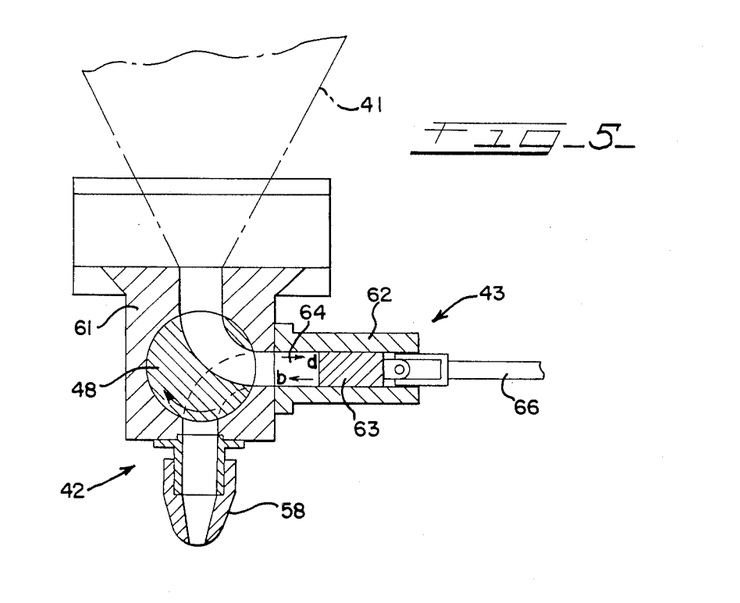
FIG. 5 is an enlarged view in section showing a part of the apparatus of FIG. 4.

FIGS. 4 and 5 are schematic diagrams showing automated machinery for making food products in accordance with the above described process and using the described molds. The machinery shown in FIG. 4 utilizes air pressure for operating the various parts of the machine.

The compressed air used to drive the machine is supplied by an air compressor 31 at a pressure of approximately 7kg/cm$^2$. One branch of the pressurized air line is connected through a shut-off valve 32 to the interior of a closed coloring agent tank 33 and applies pressure to the liquid coloring agent 34 inside the tank. A liquid line 35 carries the coloring agent from the tank 33 to each of a plurality of spraying nozzles 36 and a control valve 37 in this liquid line 35 operates in conjunction with a control valve 38 in an air line 39 also connected to the spraying nozzles 36. The air line 39 is connected so that the air is guided to the spraying nozzles via the control valve 38 and the coloring agent is sprayed from the nozzles 36.

In addition, a hopper 41 is filled with the raw paste of ground fish meat, which is fed to a filling unit 42 by an extruder 43. An air line 44 is connected to the extruder 43 via a control valve 45 and a shut-off valve 46. In addition, an air line 47 is connected to a switch valve 48 (better shown in FIG. 5) on the hopper, an air line 49 is connected to the filling unit's control apparatus 51, and an air line 52 is connected to a cleaner 53 which cleans the molds. A control valve 54 is connected to the lines 47 and 49 and a shut-off valve 56 is connected to the lines 47, 49 and 52. Multiple molds 57 are arranged in a row so that the large filling openings in the molds are positioned directly beneath a plurality of filling nozzles 58 of the filling unit 42. The positional relationship of the filling unit 42 and the metal molds 57 changes as the operation progresses.

Each of the molds 57 has the construction of the molds 10 or 24 and has a cavity in, for example, the shape of a shelled shrimp as shown. Each mold 57 may contain a single cavity or it may contain several cavities. The filling unit 42 includes a publicly known fixed-amount filling apparatus (in other words, as shown in the Collection Of Commonly Known Popular Technology (page 21) published by the Japanese Patent Office on Feb. 20, 1980).

This filling unit is shown in more detail in FIG. 5. A casing 61 part of the filling unit has the hopper 41 attached to the top of it, and inside the casing 61 there is the switching valve 48 which connects the piston case 62 of the extruder 43 located at the side of the casing 61 with the hopper 41 and with each of the discharge nozzles 58 as appropriate. The valve 48 has two positions of a rotary valve member, one where the member connects the hopper with the piston chamber 64 and another where it connects the chamber 64 with a nozzle 58. The member is rotated between its two positions in synchronism with the movement of the pump piston 63, by the air pressure in the lines 44 and 47 under the control of the valves 45 and 54. When the piston 63 moves in the direction indicated by arrow d (toward the right), the switching valve 48 connects the hopper 41 with the piston chamber 64, thus filling the piston chamber with a fixed amount of the fish paste. Next, the switching valve 48 switches to connect the piston chamber with a nozzle 58 and the piston 63 moves in the direction indicated by arrow b (toward the left), thus causing the fixed amount of the fish paste to be forced out through the nozzle 58.

The piston 63 is connected to a rod 66 of a conventional pneumatic cylinder (not shown) which moves the piston 63 back and forth as described. In the specific example shown in the drawing, six molds 57 are movably mounted underneath the filler 42 which includes an equal number of nozzles 58. The control 51 operates the filling unit 42 to vertically move the unit 42 relative to the molds 57. One valve 48 is provided for each nozzle 58. The filler 42 operates to feed doses of the fish meat simultaneously for all of the nozzles 58. The spraying nozzles 36 are also equal in number to the molds, and the spacing of the molds is equal to the spacing between adjacent meat nozzles 58 and adjacent color spraying nozzles 36.

In the first step of the production process, the ground fish meat, starch which is used as a caking agent or binder, and small pieces of fish-paste food product which make the product more appetizing, are blended together inside the hopper 41. A release agent (an oil-based release agent which is commonly used in food production) is preferably applied to the inside walls of the mold cavities, the two halves of each mold are fastened together, the molds are positioned under the nozzles 36, and then the food coloring agent 34 is sprayed onto the mold cavities. The color of the coloring agent is selected according to the product being produced.

Next, the molds are moved under the nozzles 58 and the filling unit 42 is operated, causing the raw fish paste to be forced through the nozzles 58 and into the molds. Thus the fish paste is formed into the shape of the shelled meat of a selected shellfish. The filled molds 57 are then heated by steam or gas roasting to approximately 80° to 90° C. for about 1 to 1.5 minutes by a conventional heating apparatus 67 thus heating and solidifying the fish paste inside the molds; the molds are then cooled and the products can be removed at a temperature of approximately 60° C. Next, the two-piece molds 57 are opened and turned upside down by a mechanism 68 connected to the molds, causing the food products to fall into a suitable receptacle; any products which have adhered to the inside walls of the molds and do not immediately fall out may be scraped out by using a rotating roller brush of the mechanism 68 (not shown in the drawings).

The metal molds 57 are then cleaned by the cleaner 53 which directs a cleaning solution on the molds and by using a brush and hot water spray, and the entire process is repeated over and over again. A closed-loop conveyor may be provided whereby the raw materials are supplied from one end while completed products are automatically removed on the other end.

Figure 6:
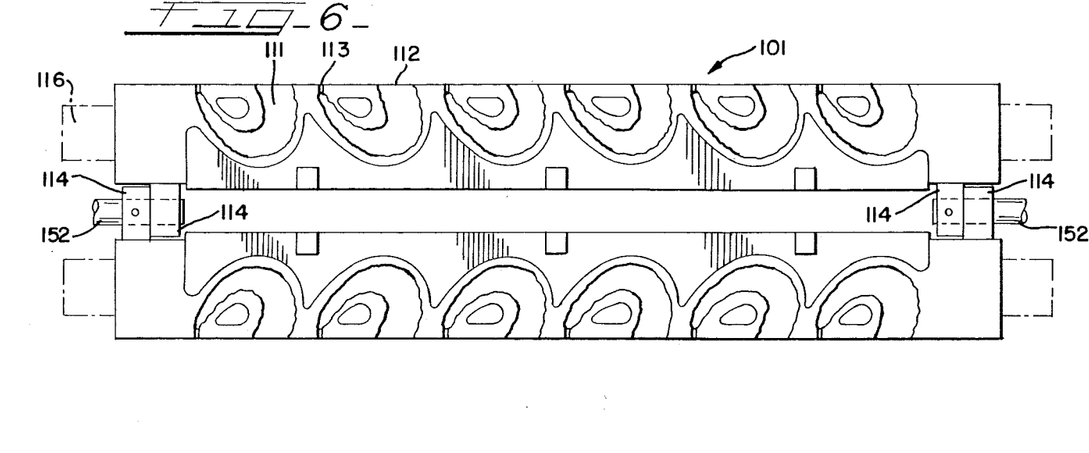
FIG. 6 is a plan view showing split molds of production apparatus, in the open state.
Figure 7:
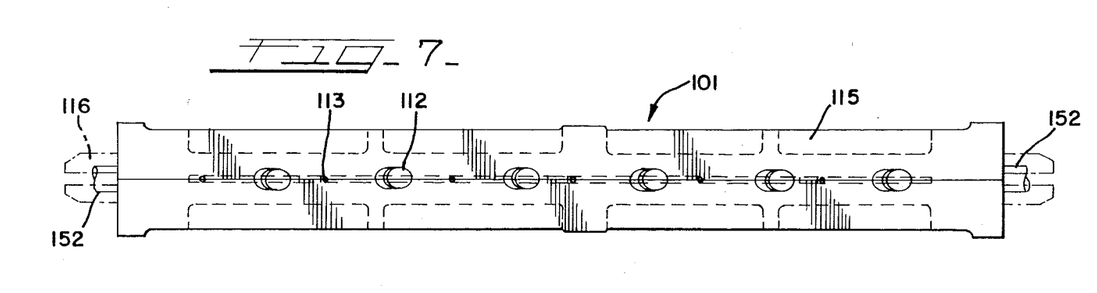
FIG. 7 is a plan view showing the split molds in the closed state.
Figure 8:
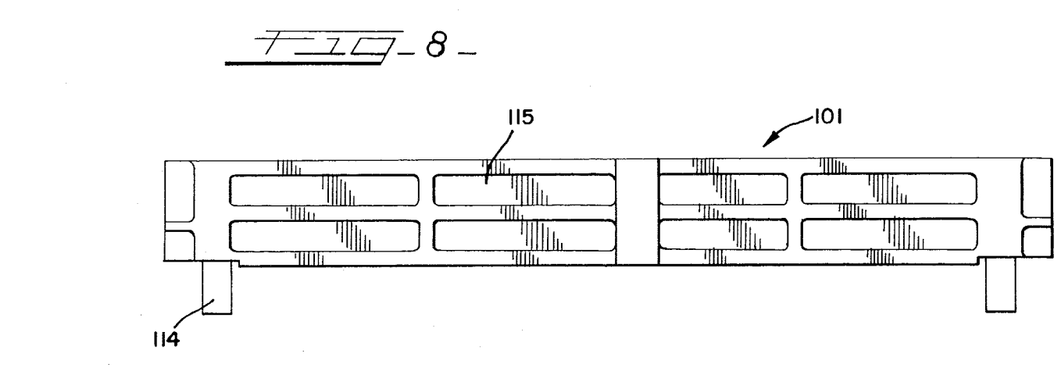
FIG. 8 is a side view of the split molds.

FIGS. 6 to 18 show large quantity production apparatus in accordance with this invention. Referring to FIGS. 6, 7 and 8, cavities 111 (formed in the shape of the shelled meat of shrimp), paste injection ports 112, and air escape holes 113 are formed on the inside of each split mold 101. Hinges 114 are provided for opening and closing of the molds. Concave sections 115 are provided in order to reduce the thickness of the molds, thus allowing them to be heated from the outside. When filling the cavities 111 with a paste made from ground fish meat, the two halves of the split molds are closed and the paste is injected under pressure into the cavities 111 through the paste injection ports 112. The air inside the cavities 111 at the time of injection is forced out through the air escape holes 113. The paste inside the cavities 111 of the molds 101 is heated so that it solidifies, and then the molds 101 are split in half to remove the finished food product. After the food product is removed, the molds are cleaned and then reused over and over again. The inside walls of the cavities 111 of the molds 101 are preferably Teflon coated so that the finished food product may be easily released and removed from the molds 101.

Figure 9:
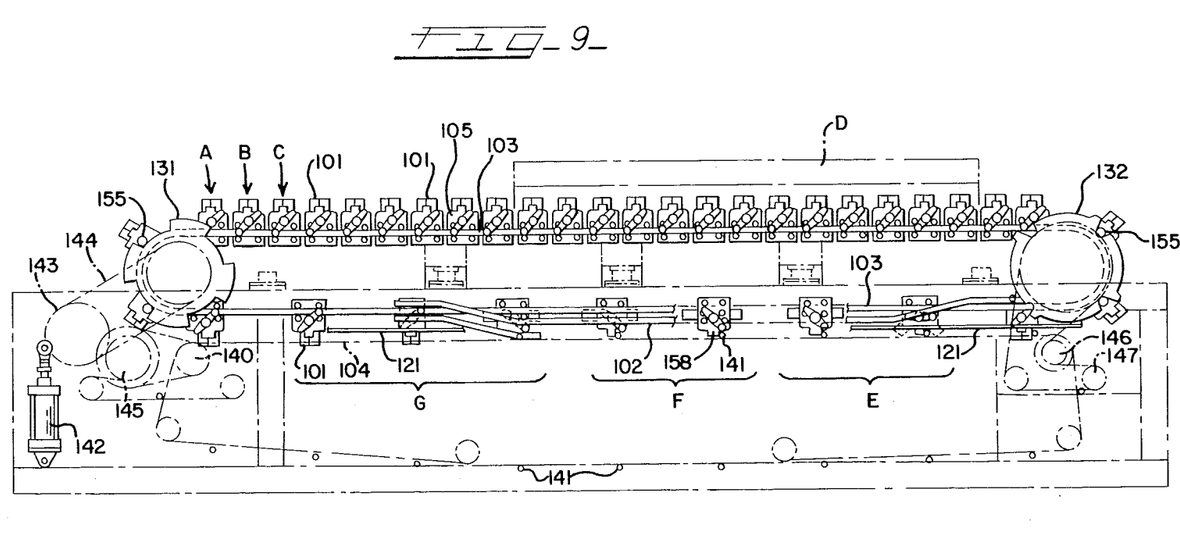
FIG 9 is a side view showing apparatus for moving the molds.

In FIG. 9, the molds 101 are mounted onto support apparatus 105 and moved clockwise along a pair of parallel endless tracks 103. The molds 101 are positioned between the two tracks 103. The movement of the molds 101 is accomplished by the rotation of two revolving discs 131 and 132 located at either end of the tracks 103 and the movement of engagement pieces 141 mounted to the conveyor belt 104 provided beneath the tracks 103, and the molds are consecutively pushed along on the upper portions of the tracks. In other words, when the piston of the cylinder 142 is extended, the end of the piston rod pushes upwardly on the periphery of a crank 143. This stroke corresponds to one-quarter of a clockwise revolution of the crank, and the crank 143 is stopped during the downward stroke of the cylinder 142. The intermittent revolution of the crank 143 is transmitted to the revolving disc 131 via a belt 144, thus causing the revolving disc 131 to revolve one-quarter of a revolution at a time. The revolution of the revolving disc 131 is transmitted to a pulley 145 via another belt, thus causing it to revolve as well, and this pulley 145 causes the conveyor drive wheel 140 to revolve via a belt. The revolution of the conveyor drive wheel 140 causes the conveyor belt 104 to revolve counterclockwise, and the engagement pieces 141 move along at specific intervals and thus engage and move the molds 101. The engagement pieces 141 engage the support plates 158 of the mold support apparatus 105 in order to move the molds. The revolution of the conveyor belt 104 causes the pulley 146 to revolve, and via the pulley 147, the revolving disc 132 revolves one-quarter of a revolution at a time in synchronization with the revolving disc 131. Each of the revolving discs 131 and 132 has four notched parts in its periphery which move the support apparatus 105 of the molds 101.

Figure 10:
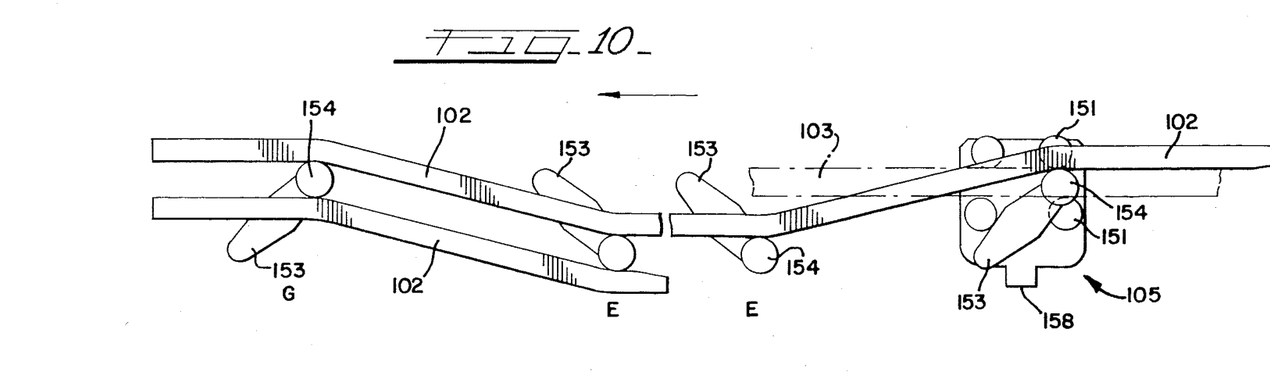
FIG. 10 is an enlarged side view showing the mold opening/closing guide section of the apparatus.
Figures 11, 12, 13:
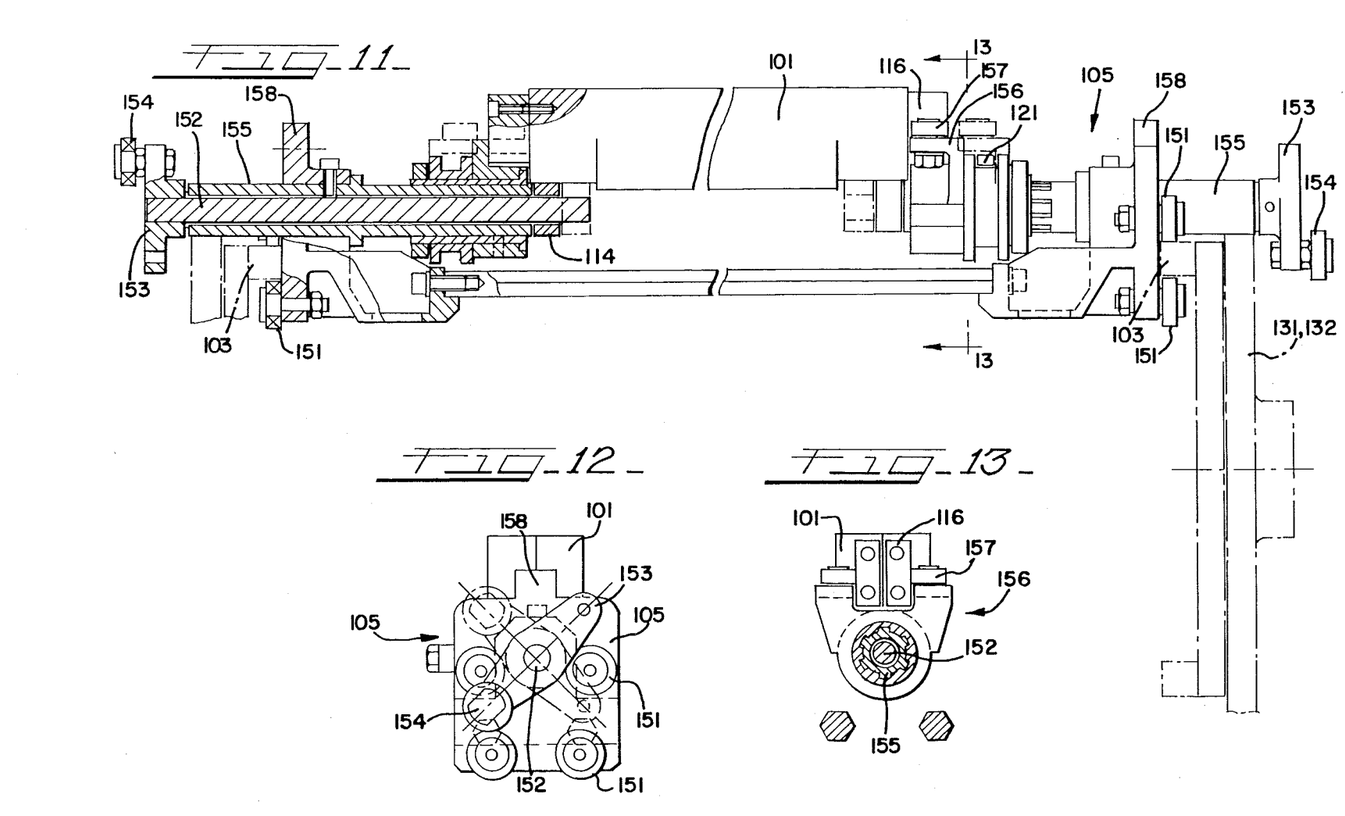
FIG. 11 is a frontal view partially in cross section of a mold and the support apparatus for that mold.
FIG. 12 is a side view from the right side of FIG. 11.
FIG. 13 is a cross-sectional view along the line 13—13 in FIG. 11.

Referring to FIGS. 11 to 13, each support apparatus 105 is supported on the two tracks 103 by four upper and lower rollers 151. A pair of horizontal shafts 152 for each mold 101 are secured to the hinges 114 of each of the split molds 101. To the end of each of these shafts 152 is mounted an opening/closing lever 153 at a right angle to the shaft 152, and the swinging of each lever 153 within a range of 90° causes one half of the mold to swing 90°. Thus, the mold can be open and closed by swinging the left and right levers 153 in opposite directions simultaneously. The swinging of the levers 153 is accomplished by the operation of a roller 154 provided on the end of each lever 153 acting via guides 102 (FIGS. 9 and 10). The rollers 151 are supported by the support plates 158, and sleeves 155 secured to the support plates 158 cover the shafts 152 in such a manner as to allow them to revolve. These sleeves 155 are engaged by the notched parts of the revolving discs 131 and 132.

There are mold locking devices 156 located between the support plates 158 and the mold 101; when the mold 101 is closed, these locking devices 156 move close to the mold 101 and cause their rollers 157 to clamp the split fixtures 116 secured to both sides of the mold between them. When the mold 101 is open, the locking devices 156 recede outward to the positions indicated by the broken lines in FIG. 11. The sleeves 155 and the locking devices 156 are interconnected by a spline in such a manner as to allow movement in the axial direction. The locking and unlocking of the mold 101 is accomplished by guides 121 which will be described hereinafter.

Figure 14:
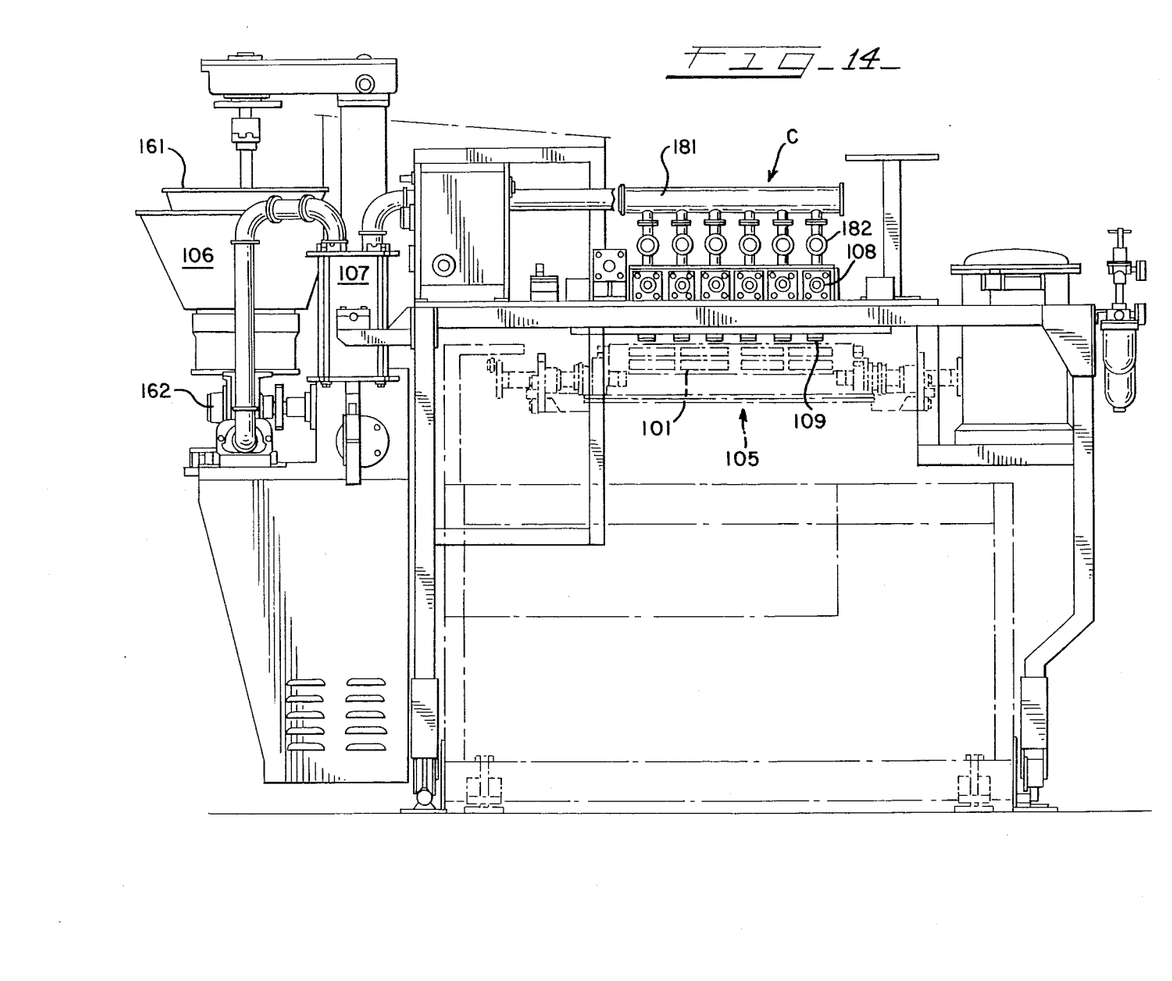
FIG. 14 is a frontal view showing the apparatus for supplying the fish paste.
Figure 15:
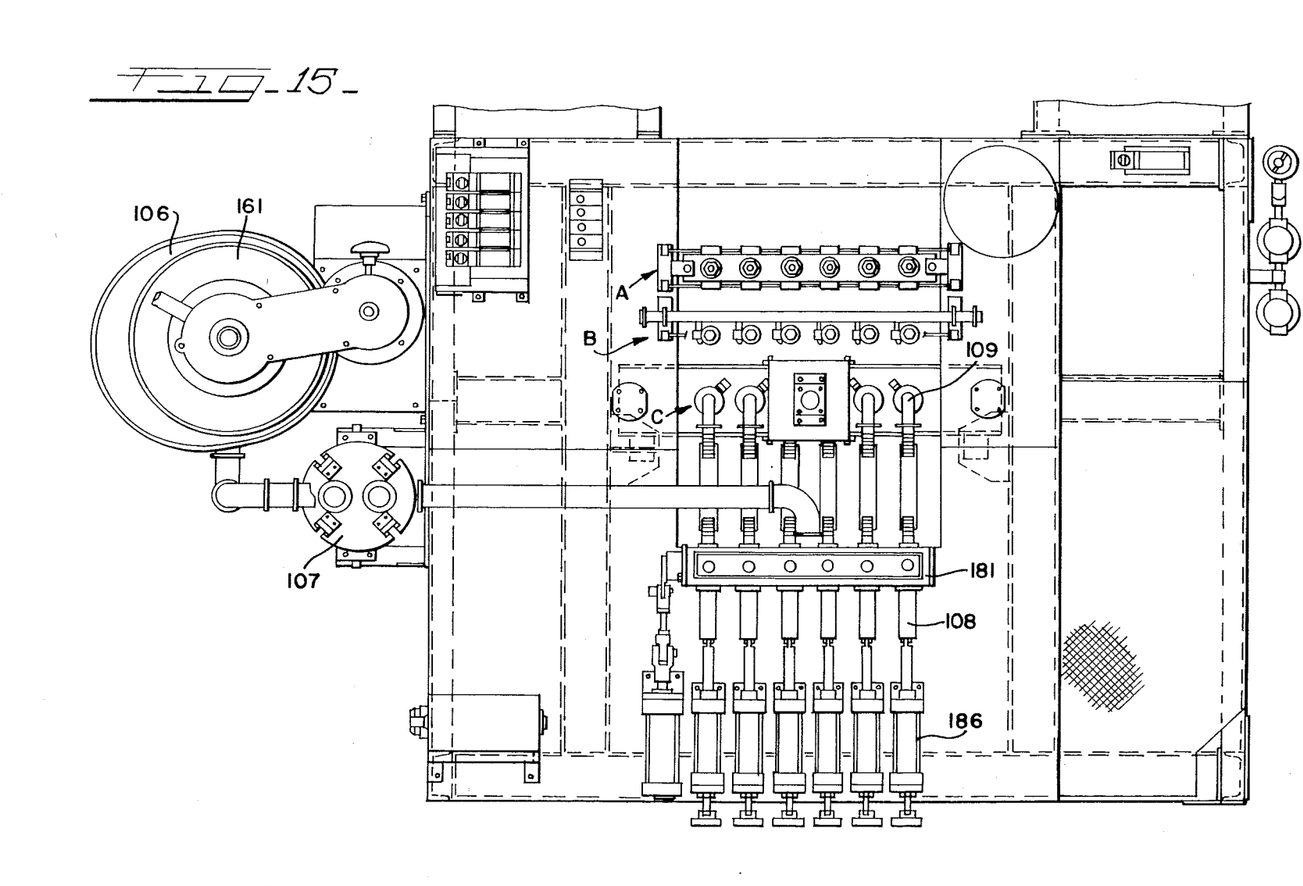
FIG. 15 is a plan view of the apparatus shown in FIG. 14.
Figure 16:
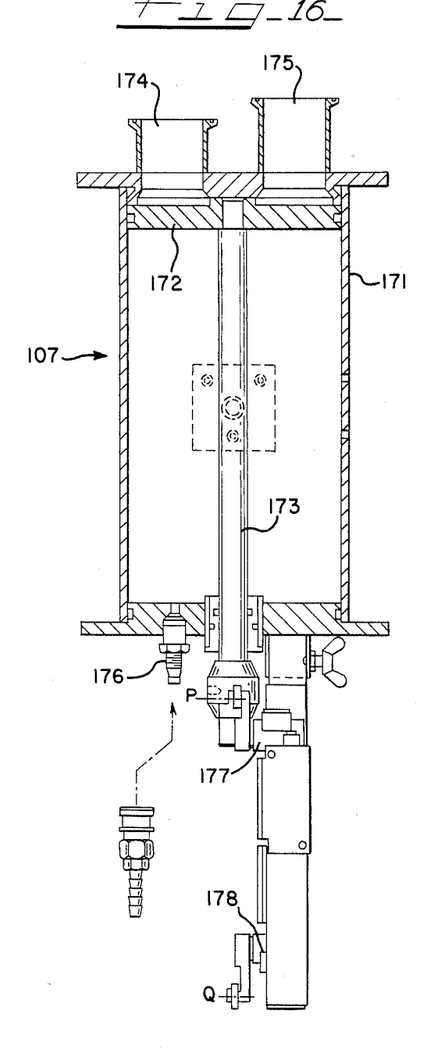
FIG. 16 is a side view partially in cross section of the apparatus for extruding the fish paste.

Referring to FIGS. 14, 15 and 16, the ground fish meat is processed into a paste by the mixer 161 and accumulated in the hopper 106. In FIGS. 15 and 9, A indicates the position of the nozzles for the supply of a mold release agent, B indicates the location of the nozzles for the supply of a coloring agent, and C indicates the location of the nozzles for the supply of the fish paste. The fish paste is fed under pressure from the hopper 106 into the paste extruder 107 by a pump 162. The cylinder 171 (FIG. 16) of the extruder 107 contains a piston 172. The fish paste is introduced into the cylinder 171 above the piston 172 and compressed air at a fixed pressure is introduced below the piston 172. The piston rod 173 detects the position of the piston and thus the position is detected within the piston's upper limit P and lower limit Q. The numeral 174 is the fish paste inlet, 175 is the fish paste outlet, and 176 is the inlet for the introduction of compressed air.

Figure 17:
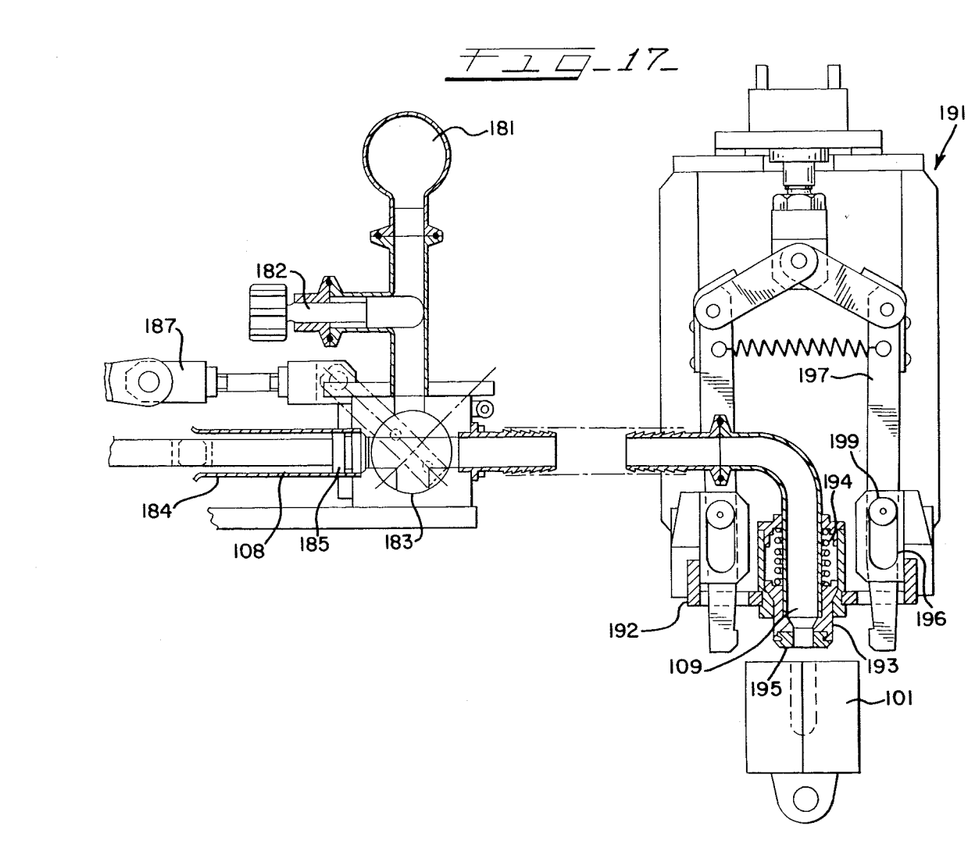
FIG. 17 is a side view partially in cross section of the paste filling unit and the nozzle.

When the piston rod 173 reaches the upper limit P, it engages a limit switch 177 and the pump 162 begins to pump the fish paste. The pump 162 supplies the cylinder 171 with an amount of fish paste greater than the filling units 108 described hereinafter can process at one time. When the piston rod 173 then subsequently engages the limit switch at the lower limit Q, the pump 162 stops pumping, and the fish paste contained in the cylinder is then supplied through the outlet 175 to the filling units 108 by the pressure of the compressed air acting on the piston 172. The number of filling units 108 is the same as the number of fish paste injection ports 112 of one mold 101. These filling units 108 branch off of a common header 181, and they are connected to switching valves 183 (FIG. 17) via flow control valves 182. FIG. 17 shows a filling unit 108 and a nozzle 109 in the connected state. When the switching valve 183 is switched by an actuator 187, the path to the nozzle is closed, the filling unit 108 is connected to the header 181, and the fish paste is supplied to the filling unit 108 by the pressure of the cylinder 171 (FIG. 16) of the paste extruder. Each filling unit 108 is comprised of a cylinder 184, a piston 185, and a pneumatic apparatus 186 (FIG. 15) which operates the piston.

When the fish paste is injected into a mold 101, the nozzles 109 descend and come into close contact with the top of the mold 101. However, if the number of cavities into which the fish paste is to be injected is large, the length of the mold will increase, and the center of the mold could remain open slightly even if both ends of the mold are held tightly by the locking device 156. Thus securing apparatus 191 are provided to prevent the mold from opening during injection of the fish paste. Each of these apparatus has a nozzle mounting base 192 at the end of the nozzle, and this base moves up and down together with the nozzle 109. At the end of the base, a nozzle movable part 193 is mounted via a spring 194 and has a nozzle pad 195 at its tip. When the nozzle pad 195 contacts the top of the mold 101, the action of the spring 194 causes the pad to be pressed tightly against the top of the mold and the mouth of the nozzle 109 is aligned with the paste injection port 112. The nozzle pad 195 may be made of silicone. As shown in the drawings, two opposing levers 197 supported by rollers 199 are supported by the nozzle mounting base 192 in slots 196.

Figure 18:
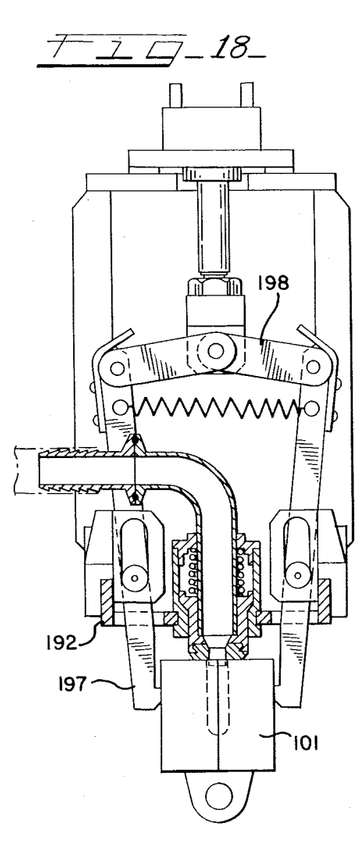
FIG. 18 is a side view partially in cross section showing the operation of the nozzle.

When the base 192 ascends, the levers 197 are supported at the top of the slots 196, and, as shown in FIG. 18, when the base 192 descends, it lowers the levers 197 and the lower ends of the levers 197 clamp the two sides of the mold 101. Through the action of link 198 at the top of the levers 197, in addition to the levers being lowered, the lower ends of the levers 197 securely clamp the two sides of the mold 101. After the fish paste is injected into the mold, the clamping pressure of the two levers is released, and the base 192 ascends.

The following is a description of the apparatus for moving the molds and of the process for production of the food product. In FIGS. 9 and 10, the guides 121 which hold the molds in the closed state and which release the locked state when it is time to open the molds, and the guides 102 which control the opening and closing of the molds, are positioned generally parallel along the tracks 103.

The molds 101 move along the tracks 103, and the process by which the molded food product is produced from fish paste proceeds in the order A→B→C→D→E→F→G. The corresponding locations are indicated in FIGS. 9 and 10. At locations E, F and G, the guides 121 are located on the outside so that the mold locking devices 156 shown in FIG. 11 moves to the outside, and at all other locations, the guides 121 are located on the inside so that these locking devices 156 lock the molds. In addition, at locations E, F and G, the guides 102 are provided in order to cause the opening/closing levers 153 to swing 90°; as shown in FIG. 9, the rollers 154 at the ends of the levers 153 are guided by these guides 102 in order to change the direction of the levers 153 and open the molds. In the area of location G, in order to close the molds, the guides 102 are routed parallel to each other at an angle in such a manner that they hold the rollers 154 from above and below.

The following is a description of the production process. First, ground fish meat, starch which is used as a binding agent, and small pieces of fish-paste food product which make the product more appetizing, are blended together and accumulated inside the hopper 106 as the raw paste. A mold release agent an oil-based release agent which is commonly used in food production) is applied to the walls of the cavities 111 of the closed molds 101, and a food coloring agent is sprayed inside the cavities 111. The color of the coloring agent is selected according to the product being produced.

Next, the filling unit 108 is operated in order to fill the cavities with raw fish paste through the nozzles 109. The fish paste is thus formed into the shape of the shelled meat of the selected shellfish by the shape of the cavities. The filled molds 101 are then heated by a gas roasting process to approximately 80° to 90° C. for 1 to 1.5 minutes by a heating apparatus (not shown) in section D (FIG. 9), thus heating and solidifying the fish paste contained in the mold cavities. If steam is used to heat the molds, the protruding parts of the food product have a tendency to be too soft. The products can then be removed from the molds at a temperature of approximately 60° C. After the products have been removed, by separating the molds into two pieces, turning them upside down, and using a roller brush (not shown), any products which have adhered to the mold cavities 111 and have not been removed can be scraped out.

The molds 101 are next cleaned by spraying them with a cleaning solution and hot water and using a brush (not shown), and then the entire process is repeated. By moving the molds within a closed loop making skillful use of the conveyor apparatus, the raw materials can be supplied at one end and the finished products automatically removed from the other end.

In FIGS. 9 and 10, the molds 101 are prepared for processing at the bottom of the tracks 103, closed around the shafts 152 (FIGS. 11-13), and then moved to the top of the tracks 103.

At location A, the mold release agent is sprayed into the cavities 111 of the closed molds, and the molds are then moved on to location B, where the spray nozzles (FIG. 15) descend, spray the coloring agent into the cavities, and ascend.

At location C, the nozzles 109 for injecting the fish paste fit tightly against the mold's paste injection ports 112, and the fish paste is injected into the cavities. As shown in FIGS. 6 and 7, the air inside the cavities 111 is discharged out through the air escape holes 113 and the fish paste fills the cavities entirely. After the injection nozzles 109 inject the fish paste into the cavities 111, they ascend, and the fish paste breaks off above the mold.

Location D is the heating section where gas roasting is used to apply heat from outside the molds and heat the molds to from approximately 80° to 90° C. for approximately 1 to 1.5 minutes, thus heating and solidifying the fish paste. Because the mold's injection ports are open at this time, as the fish paste solidifies, the condition of the fish paste remaining in the injection ports differs slightly for each mold cavity, thus allowing the products to closely resemble individual shrimp with slight differences in their broken surfaces.

Next, the molds are moved to the bottom of the tracks 103 by the revolving disc 132, and the products are removed at a temperature of approximately 60° C. At location E, the lock guides 121 are curved outwardly, thus allowing the mold locking devices 156 to disengage outward and releasing the mold lock. In addition, because the mold guides 102 curve downwardly, the mold opening/closing levers 153 and shafts 152 swing and the mold hinges 114 open to separate the mold into two halves Because the open side of the mold is facing downward at this time, the heated and solidified products fall downward.

At location F, by applying a brush roller to the open faces of the open molds, any products still remaining in the mold cavities can be scraped out.

At location G, by spraying the molds with a cleaning solution and hot water and using a brush, the molds are cleaned both while open and while closed, and then the closed molds are moved to the top of the tracks 103 by the revolving disc 131, and the entire process is repeated over and over again.

During the heating and solidifying of the products, the fish paste is heated separately for each mold so that the fish paste itself reaches a temperature of 50° to 60° C., at which temperature the fish paste solidifies. If, however, fish-paste food products are only heated to a temperature of 50° to 60° C., a part of the solidified product will revert to a gel. For this reason, it is necessary to heat the fish-paste food products to approximately 90° C. If this is done in the same mold for an extended length of time to be heated and cooked, thus increasing the number of molds required and consequently increasing the cost of the production equipment.

Thus, removing the products from the molds when the fish paste reaches a temperature of 50° to 60° C., at which point it becomes possible to separate the products from the molds, and using a separate heating apparatus to heat them to the prescribed temperature is extremely advantageous from the viewpoint of the turn-around efficiency of the production equipment. In other words, by combining far-infrared rays, or gas burners, or a combination thereof, with steam heating, and adjusting the heating ratio, it is possible to obtain an extremely appetizing product closely resembling real shrimp.

If any one of these three heating methods (steam, far-infrared rays, or gas burners), is used alone, the products will either be too dry or there will be too much moisture, thus making it difficult to achieve the appetizing qualities of real shrimp, lobster, crab, etc.

Using this invention, ground fish meat can be processed into a high-grade seafood product with the special appearance of the shelled meat of crustacean animals. The simulated food products achieved using this apparatus closely resemble the real thing in shape, color, texture, and taste, and products of uniform size and quality can be readily supplied to the consumer.

Note that, because the fish paste is injected into the molds and heated with the injection ports remaining open, it is possible to obtain shapes which exactly resemble the shelled meat of especially shrimp from which the head has been removed, and, because means is provided to prevent the molds from opening during the injection of the fish paste, uniform products closely resembling the real thing can be obtained. Quality, too, closely resembles that of real shellfish as a result of secondary heating. In addition, because the production process is carried out while the molds are being moved by a transport apparatus, continuous production is possible even though each process is a batch system, thus making the invention an extremely effective production apparatus.

It will be apparent from the foregoing that novel apparatus and process have been provided for the production of fish-paste food products with the appearance of the shelled meat of such shellfish as shrimp, crab claws, lobster, abalone, etc. The apparatus comprises two-piece metal molds with inside cavities conforming to the shelled meat. The apparatus may further comprise at least one nozzle which sprays a coloring agent into the inside of the metal molds, a filling unit which presses a paste of ground fish meat into the metal molds, a heating unit which heats and solidifies the fish paste, and means for removal of the heated and solidified shellfish-like fish-paste food products from the molds. Thus ground fish meat can be processed into a high-grade seafood product with the special appearance of the shelled meat of a shellfish. Using this invention, food products which closely resemble expensive shellfish meat in shape, color, texture, and taste can be produced inexpensively and rapidly, and generally uniform food products can be supplied to the consumer, thus making this invention extremely useful and effective.

What is claimed is:

1. Apparatus for producing a food product having the appearance of the shelled meat of a shellfish, comprising a split mold having an internal cavity formed by cavity walls, said cavity having the shape of a shellfish to be simulated, said walls including a plurality of flat portions separated by projections, a fill opening and a vent opening at the outer surface of said mold and connected to opposite ends of said cavity for filling and venting said cavity, and a filling unit connectable to said fill opening for pressing a substantially fixed amount of fish meat paste into said internal cavity, said fill opening having the shape of one end of the shellfish.

2. Apparatus for producing a food product having the appearance of the shelled meat of a shellfish, comprising a split mold having an internal cavity formed by cavity walls, said cavity having the shape of a shellfish to be simulated, said walls including a plurality of flat portions separated by projections, at least two openings at the outer surface of said mold and connected to opposite ends of said cavity for filling and venting said cavity, and means for spraying an aqueous coloring agent into said cavity.

3. Apparatus as in claim 1, wherein said cavity walls are formed of Teflon.

4. Apparatus for producing a food product having the appearance of the shelled meat of a shellfish, comprising a split mold having an internal cavity formed by cavity walls, said cavity having the shape of a shellfish to be simulated, at least one opening at the outer surface of said mold and connected to an end of said cavity for filling said cavity, means for spraying a coloring agent into said cavity, a filling unit for pressing a fish meat paste into said cavity, heating means for heating and solidifying said paste in said cavity to produce said food product, and means for removing said food product from said mold.

5. Apparatus as in claim 4 wherein said mold cavity walls are formed of Teflon.

6. Apparatus as in claim 4, wherein said filling unit includes a piston for extruding a fixed amount of said meat paste.

7. Apparatus as in claim 1, wherein said means for removal of the product from said mold includes means for opening and turning said mold upside down and a rotating brush for removing the products.

8. A food product production apparatus, comprising a plurality of split molds having cavities formed therein, said cavities having the shape of a desired food product, means for injecting under pressure a paste of ground fish meat into said cavities, means for heating said fish paste from outside the molds and thereby solidifying said food product, and means for opening said molds and removing the heated and solidified food product, said injection means being separated from said mold except during said injection, said split molds when closed further forming injection ports and air escape ports.

9. An apparatus as in claim 8, wherein said molds are made of metal and the inside walls of said mold cavities are coated with Teflon.

10. An apparatus as in claim 8, wherein said injection means includes a fixed-amount filling apparatus constructed in such a manner that the nozzles of the filling units connect with the injection ports of said molds during injection and, after injection, said nozzles separate from said injection ports.

11. An apparatus as in claim 8, wherein said heating means comprises gas burners constructed in such a manner as to apply heat to the periphery of the molds.

12. An apparatus as in claim 8, wherein said removal means includes means for opening the molds to face downwardly and a rotating brush which contacts the opened contact surfaces.

13. A food product production apparatus comprising, in succession, transport means for moving split molds, means for applying a mold release agent and a coloring agent to the inside walls of said molds while said molds are in a closed state, means for injecting fish paste into said molds, means for heating said fish paste and molds, means for opening said molds and removing heated and solidified food products therefrom, and means for closing said molds.

14. An apparatus as in claim 13, wherein said transport means comprises a conveyor which moves while supporting the molds by both sides of the conveyor.

15. An apparatus as in claim 13, and further comprising reheating means for reheating the solidified products prior to completion of the finished products.

16. An apparatus as in claim 15, wherein said reheating means comprises a far-infrared ray apparatus combined with a steam heating means.

17. An apparatus as in claim 15, wherein said reheating means comprises a gas burner combined with a steam heating means.

18. An apparatus as in claim 15, wherein said reheating means comprises a far-infrared ray apparatus and a gas burner combined with a steam heating means.

19. A food product production apparatus, comprising a plurality of split molds having cavities formed therein, each of said cavities having an injection opening and a normally open vent opening, said cavities having the shape of a desired food product and including flat portions separated by projections, means for spraying a coloring agent into said cavity through said injection openings, injection means for injecting under pressure a paste of ground fish meat into said cavities through said injection openings, means for moving said injection means away from said injection openings after injection of said paste, means for heating said fish paste from outside the molds and thereby solidifying said food product, and means for opening said molds and removing the heated and solidified food product, said injection means being separated from said molds except during said injection.

* * * * *